United States Patent [19]

Owens

[11] Patent Number: 4,930,248
[45] Date of Patent: Jun. 5, 1990

[54] SNAGGING HOOK

[76] Inventor: John B. Owens, P.O. Box 467, Camdenton, Mo. 65020

[21] Appl. No.: 346,704

[22] Filed: May 3, 1989

[51] Int. Cl.$^5$ ............................................. A01K 83/00
[52] U.S. Cl. ...................................... 43/43.16; 43/44.8
[58] Field of Search ...................... 43/43.16, 43.2, 44.8

[56] References Cited

U.S. PATENT DOCUMENTS

| | | | |
|---|---|---|---|
| 141,910 | 8/1873 | Allen | 43/43.16 |
| 683,750 | 10/1901 | Guindon | 43/43.16 |
| 775,727 | 11/1904 | Koch | 43/43.16 |
| 1,706,881 | 3/1929 | Hampson | 43/43.16 |
| 2,101,491 | 12/1937 | Chilcott | 43/43.16 |
| 2,874,509 | 2/1959 | Talbert | 43/43.2 |
| 2,998,669 | 9/1961 | Shook | 43/44.8 |
| 3,101,565 | 8/1963 | Hoder | 43/43.16 |

FOREIGN PATENT DOCUMENTS 223417 11/1968 Sweden ........................... 43/43.16

Primary Examiner—Kurt Rowan
Attorney, Agent, or Firm—Michael Yakimo, Jr.

[57] ABSTRACT

A snagging hook comprising an elongated shank with a hook element thereon. A triangular base supports the hook in an upright position and obtains a firm purchase on a support surface therebelow.

9 Claims, 1 Drawing Sheet

SNAGGING HOOK

BACKGROUND OF THE INVENTION

This invention pertains to a fishing hook and more particularly to a snagging hook for grabbing fish.

Various types of fishing hooks are known in the art for snagging fish or the like. Problems have arisen in the use of such hooks as the hook portion thereon tends to get snagged on underlying brush or the like. Also in some cases the hook faces towards the bottom of the river or lake bed which inhibits its snagging ability. Athough certain fish hooks have suggested the use of a weight to position the hook in a desired position, these hooks were designed for use with bait as a lure on the hook portion thereof. Thus the shape of the weight was designed to have wing-like extensions and a convex, corrugated underside. This configuration caused the hook to rise and/or flutter when drawn through the water. Such configuration is undesirable in a snagging hook which should rest firmly on an underwater surface to await a fish swimming thereabove. Thus there was no previous configuration for obtaining a proper purchase on the underlying surface for use in "snag" fishing.

In response thereto I have invented a novel snagging hook which utilizes a triangular truss-like base thereon to position the hook in an upright portion for engagement with fish swimming thereabove. The hook utilizes this open triangular base so as to gain a proper purchase on an underlying surface and keep the hook at a relatively stable, upright position. The open base diminishes the effect of water passing through the base and allows the hook to easily slide over logs, rocks and through brush without being snagged thereon.

It is therefore a general object of this invention to provide an improved snagging hook for grabbing fish or the like.

Another general object of this invention is to provide a snagging hook, as aforesaid, which is designed to be positioned in an upright position relative to a support surface therebelow.

A further object of this invention is to provide a snagging hook, as aforesaid, which is designed to easily slide over rocks, logs and through brush or the like.

Another important object of this invention is to provide a fishing hook, as aforesaid, which is designed to obtain a firm purchase on an underlying surface.

A more particular object of this invention is to provide a snagging hook, as aforesaid, having a truss-like base which supports the hook in an upright position.

Another particular object of this invention is to provide a snagging hook having an open base thereon, as aforesaid, designed to inhibit interference with underlying rocks, logs, brush or the like and water passing therethrough.

A further object of this invention is to provide a snagging hook having a base thereon, as aforesaid, which is symmetrical about a shank passing therethrough.

Other objects and advantages of this invention will become apparent from an inspection of the specification, drawings and claims submitted herein.

DESCRIPTION OF PREFERRED EMBODIMENT

Figure 1:
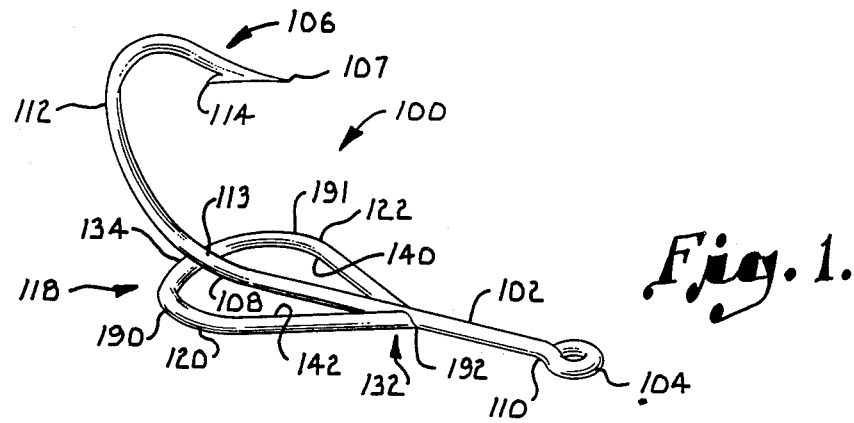
FIG. 1 is a perspective view of the snagging hook with the hook portion in a desired upright position.
Figure 2:
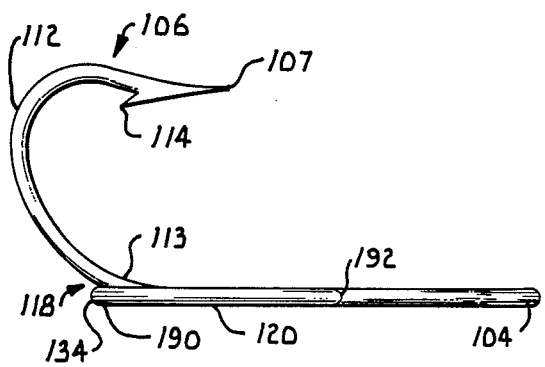
FIG. 2 is a side elevation view of the hook in FIG. 1.
Figure 3:
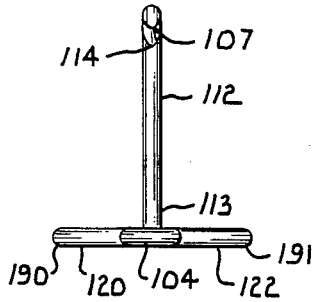
FIG. 3 is a front view of the hook in FIG. 1.
Figure 4:
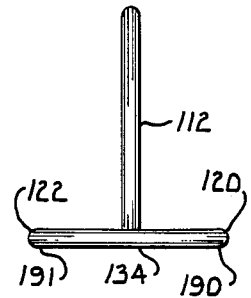
FIG. 4 is a rear view of the hook in FIG. 1.
Figure 5:
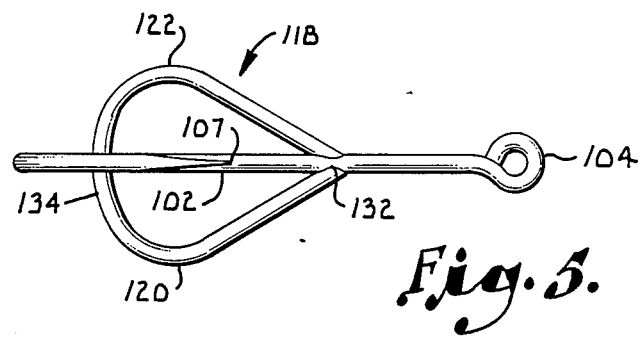
FIG. 5 is a top view of the hook in FIG. 1.
Figure 6:
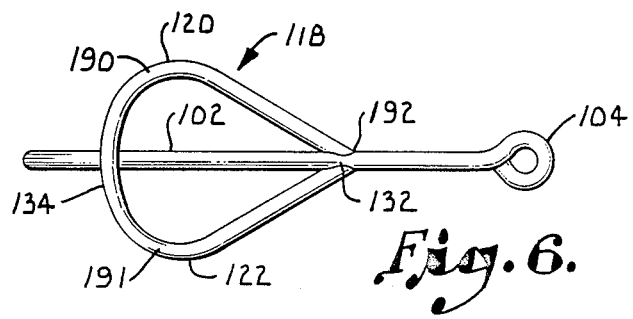
FIG. 6 is a bottom view of the hook in FIG. 1.

Referring more particularly to the drawings, FIG. 1 illustrates the snagging hook 100 in a preferred, upright position. The hook has an elongated shank 102 with an eyelet 104 and hook 106 element at opposed ends 108, 110 thereof. The hook 106 includes a curved portion 112 with a barbed 114 point 107 at one end thereof. The curved portion 112 of the hook 106 is displaced from base 118 with the point 107 being vertically displaced from the underlying shank/shaft 102.

Attached to the shank 102 is a triangular truss-like base generally designated as 118. The base 118 presents a pair of triangular-like portions 120, 122 symmetrical about shank 102. These elements 120, 122 are so formed as the shank 102 intersects a vertex 132 and extends towards an opposed side 134 of the equilateral, triangular base 118. This shank 102 represents the altitude of the base 118 such that the triangular base 118 is divided into the above-described two congruent triangles 120, 122 on opposed sides of the shank 102. As such the triangles 120, 122 present a pair of purchase elements to the base 118 so that the base 118 firmly rests on the underlying surface such as a river bed or the like. This purchase, particularly, as to the three points 190, 191, 192 with weighted shank 102 passing therethrough, keeps the hook element 106 in a desired upright position in the face of a river current or the like.

This symmetry of the weighted triangles 134, 136, relative to the shank 102, is preferred. Otherwise the hook may wobble or otherwise be in an undesirable position relative to the vertical and the underlying surface. If so skewed the snagging action of the hook 100 is inhibited.

It is also noted that the initiation of the curved portion 113 of the hook 106 from the shank 102 may be displaced from the base 118. This configuration further supports the hook 106 in a desired upright position and diminishes undesirable wobble, flutter of the hook 106 proper.

In use the eyelet 104 is attached to one end of a fishing line with the other end being held by the user. Upon tossing the hook 100 into the river bed or the like the base 118 will urge the hook 106 towards a desired upright position relative to the underlying surface. This desired hook 106 relationship is so positioned by the underlying triangular base 118 inclusive of the triangular elements 120, 122. Furthermore the apertures 140, 142 within the triangles 120, 122 enhance the resting position of the base 118 on the underlying surface as grass, weeds, rocks and the like may protrude therethrough. This action, along with the primary purchase points 190, 191, 192 enables the base 118 to obtain a better purchase on the underlying surface.

Upon the fish passing over the fishing line the user jerks the line such that the line rubs against the fish's belly and the hook 106 point 107 snags the fish. The movement of the hook 100 through the water is further enhanced by the presence of the apertures 140, 142 as the water more easily passes through the support base 118 during fishing line withdrawal.

Although one form of my invention has herein been described it is understood that it is not to be limited thereto except as set forth in the following claims and functional equivalents thereof.

What I claim is:

1. A snagging hook comprising: an elongated shank having first and second ends; a hook element extending from said first end of said shank; means on said shank for urging said hook in an upright position, said urging means comprises a triangular base with said shank passing through a vertex and towards a side of said triangle; means associated with said urging means to enhance a purchase of said urging means on an underlying surface, said means comprising:

said triangular base presenting at least three points of contact with an underlying surface to enhance said purchase thereon; and apertures in said base to allow said hook to sink towards said surface and elements on said underlying surface to protrude through said base whereby to preclude said elements from interfacing with said purchase of said urging means;

means at said second end of said shank for connection to a line, whereupon said urging means obtains a purchase on an underlying surface and positions said hook in a normal position relative to said underlying surface upon tossing said hook in a body of water.

2. The device as set forth in claim 1 wherein said urging means further comprises a weight on said shank, said weight urging said hook element in an upright position relative to said underlying surface.

3. The device as set forth in claim 1 wherein said triangular base is an equilateral triangle with said shank serving as an altitude thereof, whereby first and second triangular bases are positioned on opposed sides of said shank to enhance said urging of said hook in said upright position relative to said surface and said purchase thereon.

4. The device as set forth in claim 2 wherein said hook includes a curved portion emanating from said shank and displaced from said base.

5. The device as set forth in claim 1 wherein said connecting means is an eye for attaching on end of said fishing line thereto.

6. A snagging hook comprising:

an elongated shank having first and second ends;

a hook element extending from said first end of said shank;

means on said shank for urging said hook in an upright position, said urging means comprising:

an equilateral triangular base with said shank passing as an altitude through a vertex and towards a side of said triangle to present first and second triangular bases on opposed sides of said shank;

means associated with said urging means to enhance a purchase of said urging means on an underlying surface, wherein said enhancing means further comprises:

said triangular base presenting at least three points of contact with an underlying surface to enhance said purchase thereon; and apertures in said bases to allow said hook to sink towards said surface and elements on said underlying surface to protrude through said bases, whereby to preclude said elements from interfering with said purchase of said triangular base;

means at said second end of said shank for connection to a line, whereupon said urging means obtains a purchase on an underlying surface and positions said hook in a normal position relative to said underlying surface upon tossing said hook in a body of water.

7. The device as set forth in claim 6, wherein said urging means further comprises a weight on said shank, said weight urging said hook element in an upright position relative to said underlying surface.

8. The device as set forth in claim 7, wherein said hook includes a curved portion emanating from said shank and displaced from said base.

9. The device as set forth in claim 7, wherein said connecting means is an eye for attaching an end of said fishing line thereto.

* * * * *